Nov. 24, 1931.   E. E. SPENCER   1,833,003

WATER METER BOTTOM

Filed March 11, 1929

Edgar E. Spencer
INVENTOR

BY Victor J. Evans
ATTORNEY

Patented Nov. 24, 1931

1,833,003

UNITED STATES PATENT OFFICE

EDGAR E. SPENCER, OF PICHER, OKLAHOMA

WATER METER BOTTOM

Application filed March 11, 1929. Serial No. 346,214.

This invention relates to water meters or containers which are subject to excess pressure from freezing, or from other causes, an object being to provide means for relieving the pressure without loss of the contents of the meter or container, or danger of damage thereto.

For this purpose, the invention provides a compressible member or hollow sphere arranged to close an opening in the housing of the meter or container and held in position so that pressure within the meter or container will force the sphere into the opening in accordance with the amount of pressure, the sphere remaining within the opening until pressure is relieved.

With the above and other objects in view, the invention further includes the following novel features and details of construction, to be hereinafter more fully described, illustrated in the accompanying drawings and pointed out in the appended claims.

In the drawings:—

Figure 1:
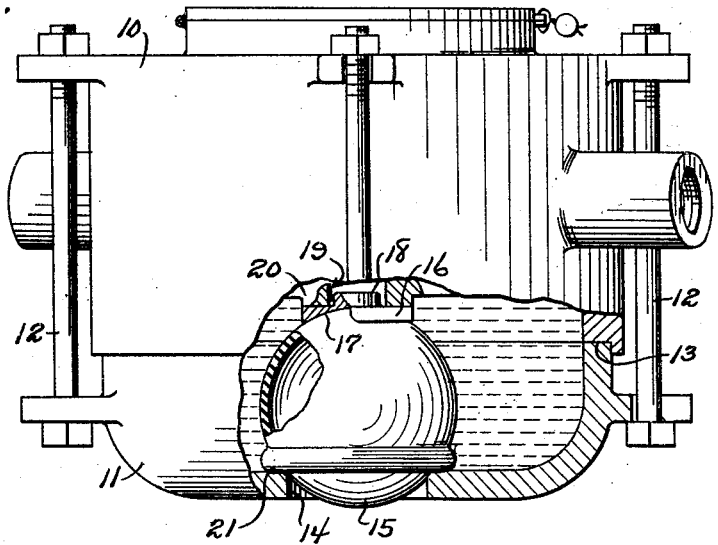
Figure 1 is an elevation partly in section showing a water meter with the invention applied.

Referring to the drawings in detail wherein like characters of reference denote corresponding parts, the invention is shown in connection with a water meter 10 having a removable bottom 11, the latter being held in place by means of bolts 12 and having a watertight connection 13 with the main portion of the meter housing.

In the present invention, the bottom 11 is provided with an opening 14 which is normally closed by means of a spherical member 15. This member may be in the form of a rubber ball or other compressible or resilient member.

In order to hold the ball properly in position to close the opening 14, the invention provides a cap 16 which is provided with a concaved seat 17 for receiving the ball or sphere 15. This cap carries a lug or projection 18 which is removably received within an opening 19 provided in a fixed element 20 secured within the meter. While the cap is shown as engaging the fixed element 20, any other suitable means may be employed for holding the cap in position so that the ball will close the opening 14.

Figure 2:
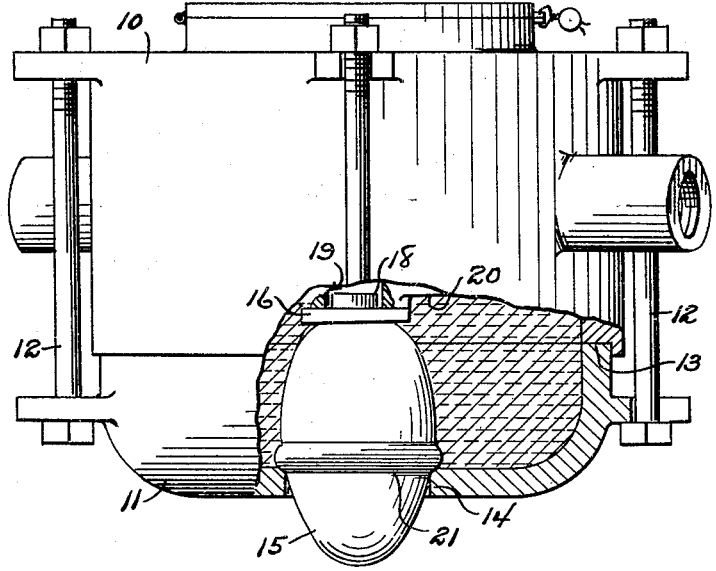
Figure 2 is a similar view illustrating a position which may be assumed by the bulb in the event of excess pressure.

In the event of excess pressure within the meter due to freezing, this excess pressure or the expansion of the ice will force the lower portion of the bulb into the opening 14 proportionate to the degree of pressure, as shown in Figure 2 of the drawings. When this pressure or expansion is relieved, the ball or bulb will again assume the position shown in Figure 1.

The bulb is surrounded by a reinforcing rib 21 which assists in restoring the bulb to normal position after it has been compressed.

The invention is susceptible of various changes in its form, proportions and minor details of construction and the right is herein reserved to make such changes as properly fall within the scope of the appended claims.

Having described the invention what is claimed is:

1. A water meter including a body having a removable wall provided with an opening, a fixed element in said body, a hollow compressible sphere engaging the edges of the opening, and a cap having a concave seat to receive the sphere, said cap being engageable with the fixed element to maintain the sphere in place.

2. A water meter including a body having a removable wall provided with an opening, a fixed element in the body, a compressible member engaging the fixed element and the edges of the opening to close said opening, and a reinforcing rib extending around the compressible member to assist in restoring the latter to normal position when relieved of pressure and engaging the removable wall about the opening.

In testimony whereof I affix my signature.

EDGAR E. SPENCER.